A. C. VAUCLAIN.
DRILL GRINDER.
APPLICATION FILED DEC. 16, 1911.
1,020,860.
Patented Mar. 19, 1912.
2 SHEETS—SHEET 2.
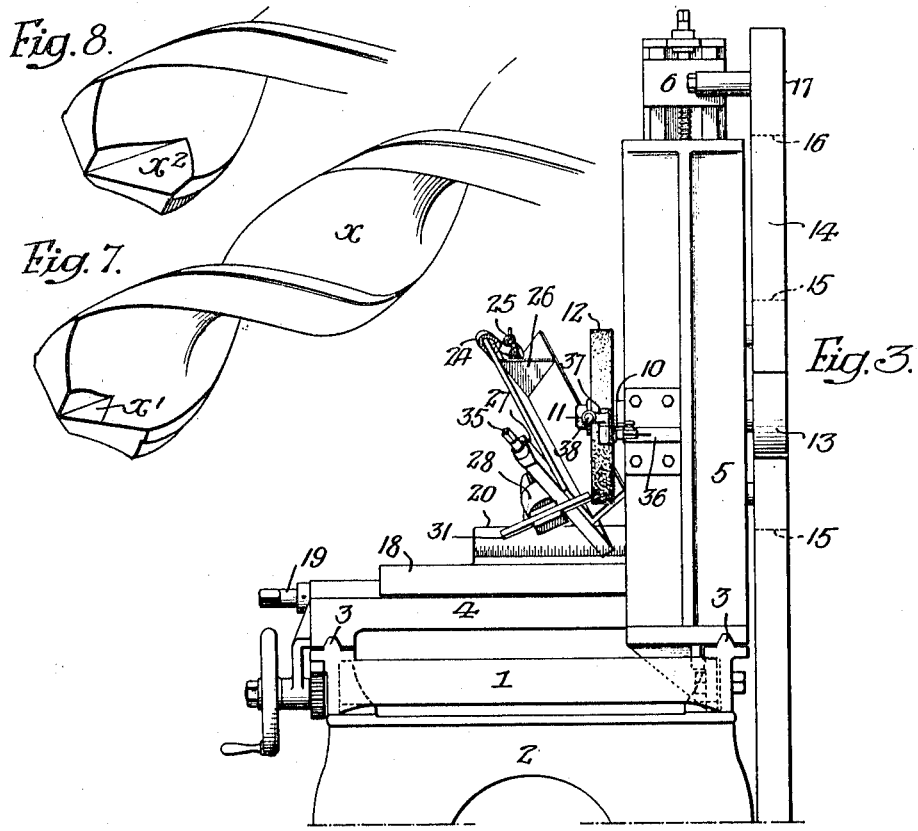
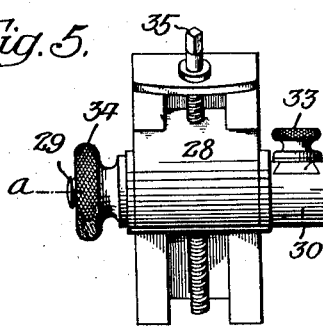
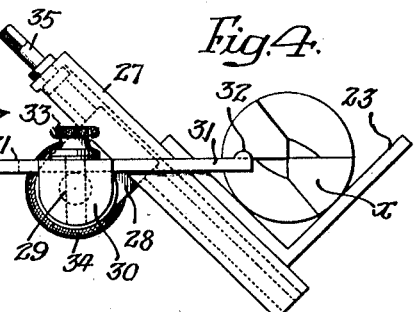
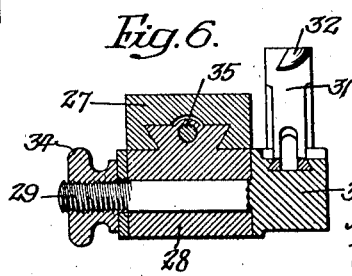
Inventor:—
Andrew C. Vauclain
by his Attorneys:—

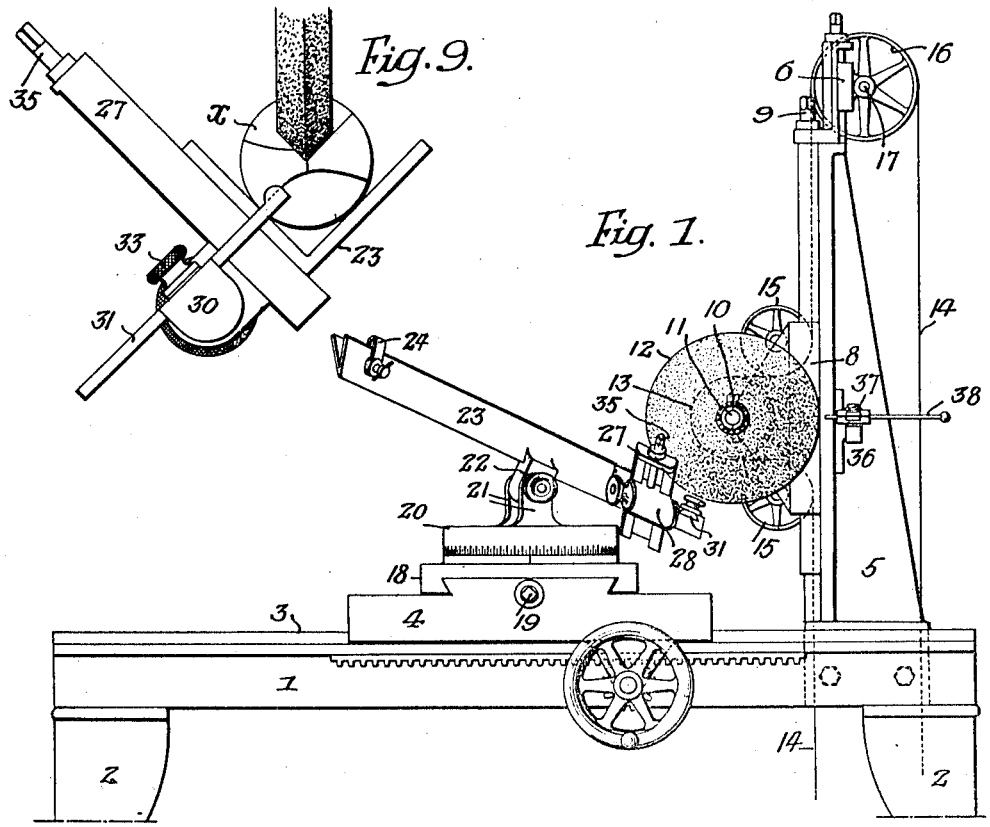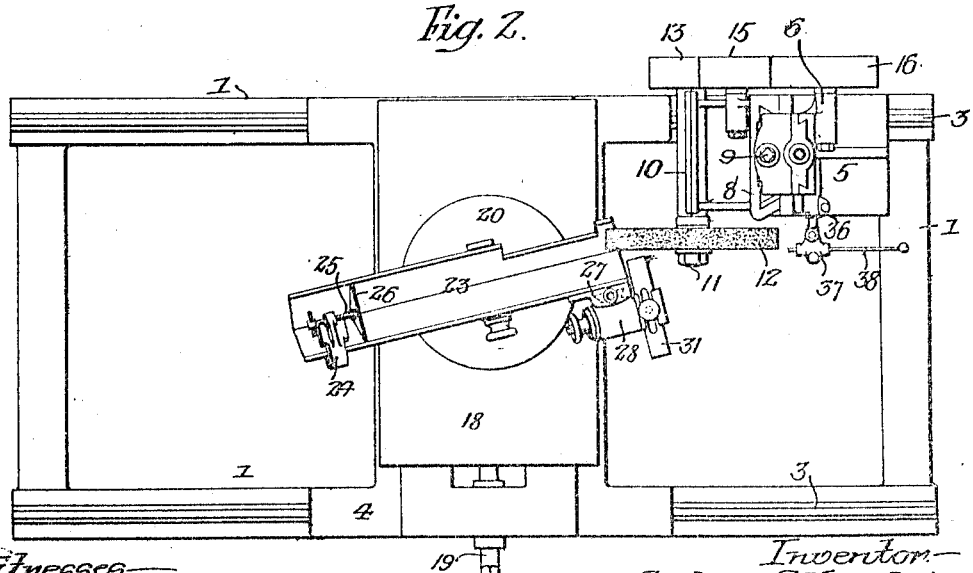

UNITED STATES PATENT OFFICE.

ANDREW C. VAUCLAIN, OF PHILADELPHIA, PENNSYLVANIA.

DRILL-GRINDER.

1,020,860.  Specification of Letters Patent.  Patented Mar. 19, 1912.

Application filed December 16, 1911. Serial No. 666,274.

*To all whom it may concern:*

Be it known that I, ANDREW C. VAUCLAIN, a citizen of the United States, residing in Philadelphia, Pennsylvania, have invented certain Improvements in Drill-Grinders, of which the following is a specification.

The object of my invention is to construct a machine which will accurately and quickly grind a drill particularly of the type clearly illustrated in the drawings and for which a patent was granted to me on the 14th day of February 1911, No. 984,323.

While my invention is adapted for grinding this type of drill it will be understood that it may be used in grinding drills of different types without departing from the essential features of the invention.

In the accompanying drawings:—Figure 1, is a side view of my improved drill grinding machine; Fig. 2, is a plan view; Fig. 3, is an end view; Fig. 4, is a view of a portion of the machine showing the drill in position; Fig. 5, is a view looking in the direction of the arrow, Fig. 4; Fig. 6, is a sectional view on the line $a-a$, Fig. 5; Fig. 7, is a perspective view of one form of a finished drill; Fig. 8, is a perspective view of another form with a slight modification in the grinding; and Fig. 9, is a view illustrating the location of the parts when a beveled grinding wheel is used.

Referring to the drawings, 1 is a base frame supported on legs 2, and having rails 3 on which travels the carriage 4. This carriage can be moved along the rails of the base frame by any of the ordinary mechanisms. In the drawings, I have shown a rack on the base frame and a pinion on the carriage meshing with the rack the pinion being turned by a hand wheel.

5 is the standard rigidly secured to the base frame 1, which supports the grinding mechanism while the carriage supports the drill to be ground. The standard is secured at one side of the base frame as shown in Fig. 2. Mounted on the standard 5 is a carriage 8 adjusted by means of a screw 9. On this carriage is the bearing 10 for the shaft 11 carrying the grinding disk 12, which is detachably secured to the shaft in any suitable manner. On the opposite end of the shaft is a belt wheel 13 and passing around this wheel is a belt 14. The belt also passes around the guide wheels 15 mounted on studs projecting from the carriage above and below the shaft 11 and around a pulley 16 on the shaft 17 carried by an adjustable bearing 6 on the standard 5. Thus the shaft 11 is driven by the belt in any position to which it is vertically adjusted.

Mounted on the carriage 4 is a slide 18 adapted to traverse under-cut ways, of the ordinary type, the slide is adjusted by a screw 19. Pivotally mounted on the slide is a carrier 20 in the form of a disk having graduations on its periphery arranged to aline with the marker on the slide so that the disk-carrier can be set at any angle desired and fastened in the position to which it is adjusted by any suitable device. Projecting from the disk-carrier are lugs 21 between which extends a projection 22 on a trough 23 in which is mounted the drill to be ground. Secured to one edge of the trough is a clamp 24 which has an adjusting screw 25 carrying a plate 26 resting in the trough and this plate acts as an abutment for the rear end of the drill. On the lower end of the trough is a slideway 27 for a head 28 carrying the shaft 29 which has an enlargement 30 in which is an undercut groove for the guide plate 31 which rests under one cutting end of the drill. This plate has a projection 32 preventing the drill from moving out of position and the plate is free of the grinder. The plate is secured to the frame by a set screw 33 (Figs. 4 and 5) and the shaft 29 is held in the position to which it is adjusted by a nut 34 mounted on the threaded end of said shaft. The head 28 is adjusted longitudinally on the ways 27 by a screw 35 so that by this construction the guide plate can be located in any position and fixed therein.

The grinding disk 12, as shown in Figs. 1 and 2, has a flat periphery and the tool trough 23 is so adjusted in respect to this grinding disk that when the tool $x$, Fig. 7, is mounted in the trough, the disk will grind the cutting end of the drill, as shown at $x'$. If it is desired to make the cut $x^2$, illustrated in Fig. 8, then the parts are adjusted so that the grinding disk will cut away more of one surface than the other, as clearly shown in said figure. The object of grinding the drill as at $x^2$ is to make a uniform cut throughout the entire length of the two cutting surfaces of the drill. The trough can be adjusted so that any desired angle may be produced at the cutting edge of the drill. When a grinding disk of the type shown in Fig. 9 is used, where the periphery is V-shaped, then the guide plate is so located that the drill, when set in position, will be in proper alinement with the grinding disk—grinding or cutting away the end of the drill in the manner shown in Figs. 7 or 8.

I have illustrated in the drawings the means for truing or surfacing the grinding disk. This consists of a bracket 36 on which is mounted a head 37 carrying a dressing tool 38. This dressing tool can be moved over the surface of the grinding disk, as desired.

The drill illustrated in Figs. 7 and 8, has the special cutting edge $x'$, $x^3$, so that the drill will cut more rapidly than drills of the ordinary type. This drill can be made either from especially prepared blanks or from an ordinary stock blank by simply removing the portion of the cutting edge of the drill, as shown in said figures.

I claim:

1. The combination in a drill grinding machine, of a base frame; a standard; a vertically adjustable carriage mounted on the standard; a shaft on the carriage; a grinding disk on the shaft; means for driving the shaft; a carriage on the base frame; a slide; means for adjusting the slide transversely on the carriage; a disk-carrier on the slide having a trough pivotally mounted on said disk-carrier; the parts being arranged that the trough can be universally adjusted with respect to the grinding disk; and means for retaining the drill in the trough.

2. The combination in a drill grinding machine, of a base frame; a standard; a carriage adjustably mounted on the standard; a shaft on the carriage; a grinding disk mounted on the shaft; means for driving the shaft; a carriage mounted on the base frame; means for moving the carriage; a transversely movable slide; a disk-carrier mounted on the slide; said disk carrier having lugs; a trough having projections adjustably secured to the lugs; the parts being so arranged that the trough can be universally adjusted with respect to the grinding disk; an adjustable stop mounted in the trough for the rear end of the drill; an adjustable guide plate at the opposite end of the trough and means for universally adjusting the said guide plate.

3. The combination in a drill grinding machine, of a base frame; a standard; a carriage vertically adjustable on the standard; a shaft on the carriage; a grinding disk on the shaft; means for driving the shaft; a carriage mounted on the base frame; a transversely adjustable slide on the carriage; a disk-carrier on the slide; means for retaining the disk carrier and the slide in position to which they are adjusted; a trough pivotally mounted at the center of the disk carrier; an adjustable stop on the trough for the rear end of the drill; a slide-way on the forward end of the trough; a head pivoted to the slide-way; means for adjusting said head; a shaft mounted in the head; means for locking the shaft in the position to which it is adjusted said shaft having a slotted enlargement and a guide plate adjustably mounted on the enlargement; means for securing the guide plate in the position to which it is adjusted; said guide plate holding the drill against movement toward the grinding disk.

4. The combination in a drill grinding machine, of a shaft; means for supporting said shaft; a grinding disk on the shaft; means for driving the shaft; a trough for the drill; means for supporting the trough so that it will have a universal movement in respect to the grinding disk; slideways on the end of the trough; a head mounted on the slideways; means for adjusting the head on the slideways; a shaft in the head; an enlargement on one end of the shaft; and a jam nut on the other end of the shaft for locking the shaft in any position to which it is adjusted; said enlargement having an under-cut guideway; and a sliding guide plate mounted in the groove; means for locking said guide plate to the enlargement; said guide plate having a projection at its end to engage the drill and to hold it in the proper position while the grinding disk is acting.

In testimony whereof, I have signed my name to this specification, in the presence of two subscribing witnesses.

ANDREW C. VAUCLAIN.

Witnesses:
Wm. E. Shupe,
Wm. A. Barr.